United States Patent
Chung et al.

(10) Patent No.: US 10,020,515 B2
(45) Date of Patent: Jul. 10, 2018

(54) STRONTIUM MAGNESIUM MOLYBDENUM OXIDE MATERIAL HAVING DOUBLE PEROVSKITE STRUCTURE AND METHOD FOR PREPARING THE SAME

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Tsui-Yun Chung, Taoyuan (TW); Chien-Kuo Liu, Taoyuan (TW); Jing-Kai Lin, Taoyuan (TW); Hui-Ping Tseng, Taoyuan (TW); Ruey-Yi Lee, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 85 days.

(21) Appl. No.: 15/209,928

(22) Filed: Jul. 14, 2016

(65) Prior Publication Data

US 2018/0019478 A1    Jan. 18, 2018

(51) Int. Cl.
*H01M 4/90* (2006.01)
*C04B 35/495* (2006.01)
(Continued)

(52) U.S. Cl.
CPC ......... *H01M 4/9033* (2013.01); *C04B 35/495* (2013.01); *C04B 35/624* (2013.01); *C04B 35/62675* (2013.01); *C04B 2235/3206* (2013.01); *C04B 2235/3213* (2013.01); *C04B 2235/3229* (2013.01);
(Continued)

(58) Field of Classification Search
CPC ........ H01M 4/9033; H01M 2008/1293; C04B 35/62675; C04B 35/624; C04B 35/495; C04B 2235/3229; C04B 2235/656; C04B 2235/3206; C04B 2235/3281; C04B 2235/3256; C04B 2235/3213
See application file for complete search history.

(56) References Cited

U.S. PATENT DOCUMENTS 7,049,466 B2 * 5/2006 Bogan, Jr. ............. C07C 51/215
558/319
8,007,691 B2 * 8/2011 Sawaki ............. C01G 49/0018
252/514

OTHER PUBLICATIONS

Huang et al., "Double Perovskites as Anode Materials for Solid-Oxide Fuel Cells," Science vol. 312 pp. 254-257. 2006. (Year: 2006).*

* cited by examiner

*Primary Examiner* — Anthony J Zimmer
(74) *Attorney, Agent, or Firm* — Rosenberg, Klein & Lee

(57) ABSTRACT

The present invention relates to a strontium magnesium molybdenum oxide material having perovskite structure and the method for preparing the same. Citric acid is adopted as the chelating agent. By using sol-gel pyrolysis and replacing a portion of strontium in $Sr_2MgMoO_{6-\delta}$ by cerium and a portion of magnesium by copper, a material with a chemical formula of $Sr_{2-x}Ce_xMg_{1-y}Cu_yMoO_{6-\delta}$ is produced, where $0 \leq x < 2$, $0 < y < 1$, and $0 < \delta < 6$. Thereby, the electrical conductivity of the material is improved. The perovskite-type cerium- and copper-replaced strontium magnesium molybdenum oxide significantly increases the electrical conductivity of the material and can be applied as the anode material for solid oxide fuel cell (SOFC).

10 Claims, 3 Drawing Sheets

(51) Int. Cl.
*C04B 35/624* (2006.01)
*C04B 35/626* (2006.01)
*H01M 8/124* (2016.01)

(52) U.S. Cl.
CPC ............... *C04B 2235/3256* (2013.01); *C04B 2235/3281* (2013.01); *C04B 2235/656* (2013.01); *H01M 2008/1293* (2013.01)

STRONTIUM MAGNESIUM MOLYBDENUM OXIDE MATERIAL HAVING DOUBLE PEROVSKITE STRUCTURE AND METHOD FOR PREPARING THE SAME

FIELD OF THE INVENTION

The present invention relates to a strontium magnesium molybdenum oxide material having perovskite structure and the method for preparing the same by replacing a portion of strontium using cerium and a portion of magnesium using copper.

BACKGROUND OF THE INVENTION

The solid oxide fuel cell (SOFC) owns multiple advantages including high efficiency, low pollution, and using fuel gas and thus regarded a highly potential green-energy conversion device. In structure, an SOFC is formed by an anode, an electrolyte, a cathode, and a connection board. In particular, the anode material plays an extremely important role. It can influence the performance of an SOFC directly.

The main function of the anode material is to act as the catalyzer for electrochemical reactions and provide fuel gas as the reaction sites for oxidation reactions. Generally, to be chosen as the SOFC anode material, the following characteristics should be included: (1) high electron conductivity and ion conductivity, where the electrical conductivity should not vary significantly as the partial pressure of oxide varies; (2) high catalyzing activity to fuel gas, high capability of suppressing carbon deposition, and certain tolerance to hazardous gas, such as hydrogen sulfide, in fuel; (3) appropriate porosity; (4) excellent chemical compatibility and matched thermal expansion coefficients with adjacent other components of cell; and (5) excellent chemical stability, structure, and phase stability in an reduction condition.

In practice, Ni/YSZ is the anode material for SOFC adopted most extensively. It has the advantages of excellent ion and electron conductivity, high catalyzing efficiency, and sufficient pores. Nonetheless, it is limited by the operating environment. It requires pure hydrogen as the fuel, resulting in high cost. If hydrocarbon gas is adopted as the fuel, Ni-based anode material induces the problems of sulfur poisoning and carbon deposition and leading to performance degradation of the fuel cell. Accordingly, a novel anode material that can catalyze hydrocarbon gas directly without the costs of carbon deposition and sulfur poisoning has become the emphasis of research.

Currently, it is already known that the strontium magnesium molybdenum oxide material having perovskite structure in the form of $A_2BB'O_6$ ($Sr_2MgMoO_6$, SMMO; Y. H. Huang et al., Science, 312, 254-257 (2006)) has excellent capability in resisting carbon deposition and sulfur poisoning. It also own outstanding catalyzing activity for hydrocarbon fuels as well as appropriate matching with electrolyte in thermal expansion coefficients. Thereby, it is regarded as the primary choice for the SOFC anode material. Nonetheless, the electrical conductivity of SMMO is not high, which is disadvantageous to be applied as the SOFC anode material. Fortunately, the A and B sites in the phase structure of the $A_2BB'O_6$-type perovskite own strong replacement capability. By replacing the ionic valence electrons at the A and B sites, defects with different valence state in the material can be produced, leading to the mixed ion and electron conductor (MIEC) property in the replaced SMMO material and increasing electrical conductivity. Accordingly, what elements and proportion should be selected to replace in the SMMO material in order to improve the electrical conductivity of the material and make it more suitable to commercial application as a SOFC anode material are the key challenges in this technical field.

SUMMARY

An objective of the present invention is to provide a strontium magnesium molybdenum oxide material having perovskite structure and the method for preparing the same. The SMMO material having perovskite structure is replaced. A portion of strontium in the SMMO is replaced by cerium and a portion of magnesium is replaced by copper. By testing, the electrical conductivity of the synthesized material is improved.

Another objective of the present invention is to provide a strontium magnesium molybdenum oxide material having perovskite structure and the method for preparing the same. The materials with atomic sizes close to those of strontium or magnesium are selected for replacement. Thereby, feasibility of the replaced SMMO material can be ensured.

Still another objective of the present invention is to provide a strontium magnesium molybdenum oxide material having perovskite structure and the method for preparing the same. The molar ratios of cerium and copper for the replacement fall within a preferred range for facilitating preparation of pure-phase replaced perovskite-type strontium magnesium molybdenum oxide anode material.

A further objective of the present invention is to provide a strontium magnesium molybdenum oxide material having perovskite structure and the method for preparing the same. Citric acid is adopted as the chelating agent. By using sol-gel pyrolysis, perovskite-type cerium- and copper-replaced strontium magnesium molybdenum oxide can be synthesized. Thereby, the electrical conductivity of the material is improved. The material can be applied as the anode material for SOFC.

In order to achieve the above objectives, the present invention discloses a strontium magnesium molybdenum oxide material having perovskite structure with a chemical formula of $Sr_{2-x}Ce_xMg_{1-y}Cu_yMoO_{6-\delta}$, where $0 \leq x < 2$, $0 < y < 1$, and $0 < \delta < 6$.

The method for preparing the material comprises steps of: mixing and dissolving strontium nitrate powder, magnesium nitrate hexahydrate powder, ammonium molybdate hexahydrate powder, copper nitrate powder, and cerium nitrate powder in deionized water to form a mixed solution; adding citric acid to the mixed solution to form a gel; baking the gel to form precursor powder; and calcining the precursor powder to form a perovskite-type strontium magnesium molybdenum oxide material with a chemical formula of $Sr_{2-x}Ce_xMg_{1-y}Cu_yMoO_{6-\delta}$, where $0 \leq x < 2$, $0 < y < 1$, and $0 < \delta < 6$. The molar ratios of the strontium nitrate powder, the magnesium nitrate hexahydrate powder, the ammonium molybdate hexahydrate powder, the copper nitrate powder, and the cerium nitrate powder correspond to the molar ratios of the composing elements in the chemical formula.

DETAILED DESCRIPTION

In order to make the structure and characteristics as well as the effectiveness of the present invention to be further understood and recognized, the detailed description of the present invention is provided as follows along with embodiments and accompanying figures.

The perovskite-type strontium magnesium molybdenum oxide material according to the present invention is not formed only by the elements strontium, magnesium, molybdenum, and oxide. Instead, cerium is used for replacing a portion of strontium and copper for a portion of magnesium for increasing the electrical conductivity of the material. After replacement, the perovskite-type strontium magnesium molybdenum oxide material has a chemical formula of $Sr_{2-x}Ce_xMg_{1-y}Cu_yMoO_{6-\delta}$, where $0 \leq x < 2$, $0 < y < 1$, and $0 < \delta < 6$.

For the molar ratios of the composing elements, the range of the molar ratio of cerium is preferably $0 \leq x < 0.9$ and the range of the molar ratio of copper is preferably $0.01 < y < 0.8$. The ranges are selected to reduce the influence of impure phases.

Figure 1:
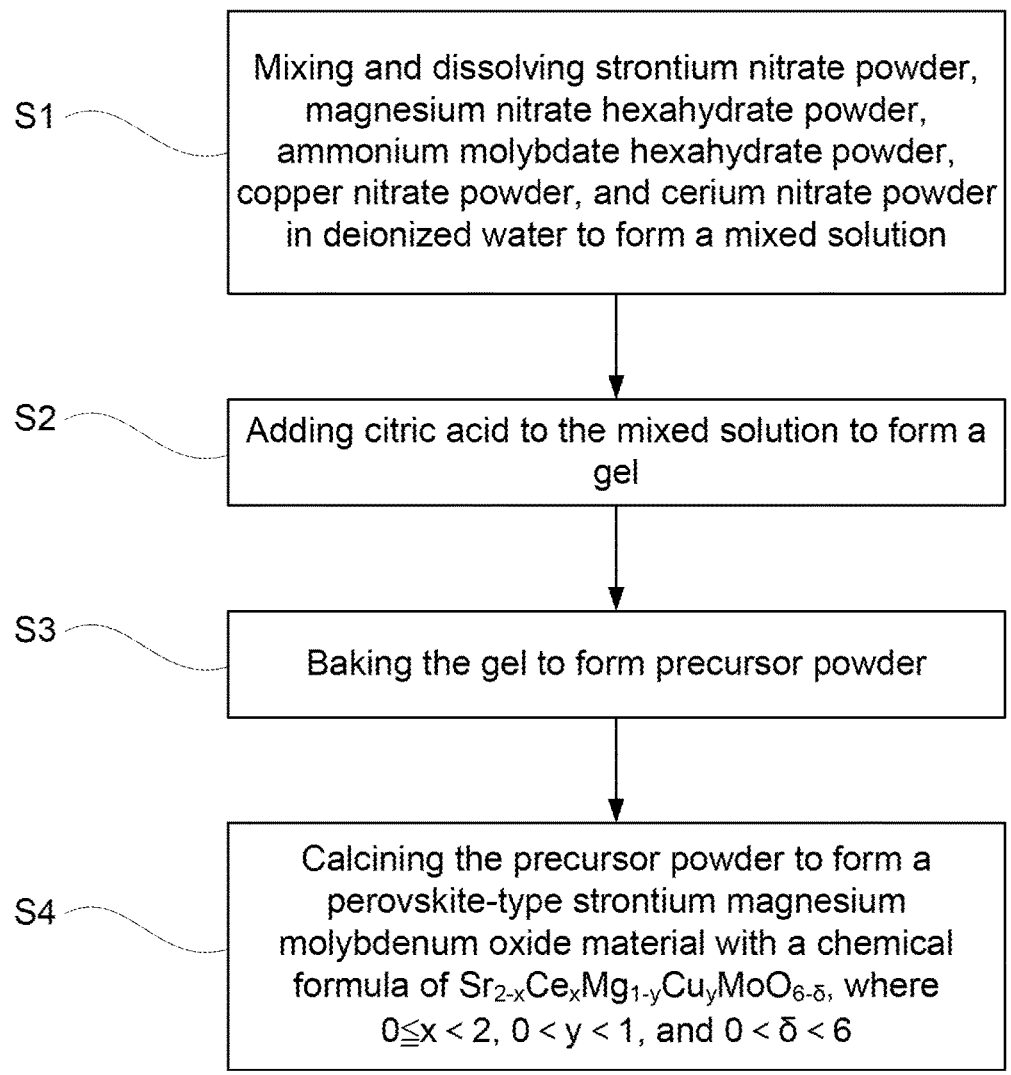
FIG. 1 shows a flowchart according to a preferred embodiment of the present invention.

In order to form the replaced perovskite-type strontium magnesium molybdenum oxide material with the chemical formula described above, by referring to FIG. 1, the method according to the present invention comprises steps of:

Step S1: Mixing and dissolving strontium nitrate ($Sr(NO_3)_2$) powder, magnesium nitrate hexahydrate ($Mg(NO_3)_2 \cdot 6H_2O$) powder, ammonium molybdate hexahydrate (($NH_4)_6Mo_7O_{24} \cdot 6H_2O$) powder, copper nitrate ($Cu(NO_3)_2$) powder, and cerium nitrate powder ($Ce(NO_3)_3$) in deionized water to form a mixed solution;

Step S2: Adding citric acid to the mixed solution to form a gel;

Step S3: Baking the gel to form precursor powder; and

Step S4: Calcining the precursor powder to form a perovskite-type strontium magnesium molybdenum oxide material with a chemical formula of $Sr_{2-x}Ce_xMg_{1-y}Cu_yMoO_{6-\delta}$, where $0 \leq x < 2$, $0 < y < 1$, and $0 < \delta < 6$.

In the above steps, the molar ratios of the strontium nitrate powder, the magnesium nitrate hexahydrate powder, the ammonium molybdate hexahydrate powder, the copper nitrate powder, and the cerium nitrate powder correspond to the molar ratios of the composing elements in the chemical formula. The ratios can be adjusted appropriately.

According to an embodiment, based on stoichiometry, strontium nitrate powder, magnesium nitrate hexahydrate powder, ammonium molybdate hexahydrate powder, copper nitrate powder, and cerium nitrate powder are weighed and mixed in the deionized water. A magnet can be used for stirring to uniform mixing and forming the mixed solution.

After the above powders are dissolved completely, by referring to the total amount of metal ions of added various metal salt powders as described above, the citric acid with a molar ratio of 1:1 is dripped into the mixed solution form the gel. In this step, a magnet can be used to stir continuously until the citric acid and the mixed solution are mixed uniformly. In addition, a heating pack is used to increasing the temperature to 70~90° C., preferably 80° C., until the gel is formed.

Afterwards, the gel is baked to form the precursor powder. In this step, the gel is put into an oven and heated to 100~120° C., preferably 110° C., to form the precursor powder $Sr_{2-x}Ce_xMg_{1-y}Cu_yMoO_{6-\delta}$.

The baked and dry precursor powder $Sr_{2-x}Ce_xMg_{1-y}Cu_yMoO_{6-\delta}$ is then calcined. According to a preferred embodiment of the present invention, the precursor powder is first calcined in atmosphere for 8 to 48 hours at the temperature 1200° C.~1300° C. The calcined power is just the strontium magnesium molybdenum oxide material having perovskite structure. A portion of strontium is replaced by cerium and a portion of magnesium is replace by copper, and thus giving $Sr_{2-x}Ce_xMg_{1-y}Cu_yMoO_{6-\delta}$, where $0 \leq x < 2$, $0 < y < 1$, and $0 < \delta < 6$.

Moreover, in order to remove the organic materials in the precursor powder effectively, before the step of calcining, the method according to the present invention further comprising a step, in which thermal treatments are performed on the precursor powder to decompose the organics contained in the precursor powder. The temperature of the first-stage thermal treatment is 300~500° C. According to a preferred embodiment for the first stage, the precursor powder is grinded fine before it is placed into a high-temperature oven set at 400° C. for 6 hours for decomposing organics. After reducing to room temperature, the powder is grinded again, then a 700~1000° C. second-stage thermal treatment is performed. According to a preferred embodiment for the second stage, after the precursor powder is grinded fine, it is placed into a high-temperature oven set at 900° C. for 10 hours for further decomposing organics.

Figure 2:
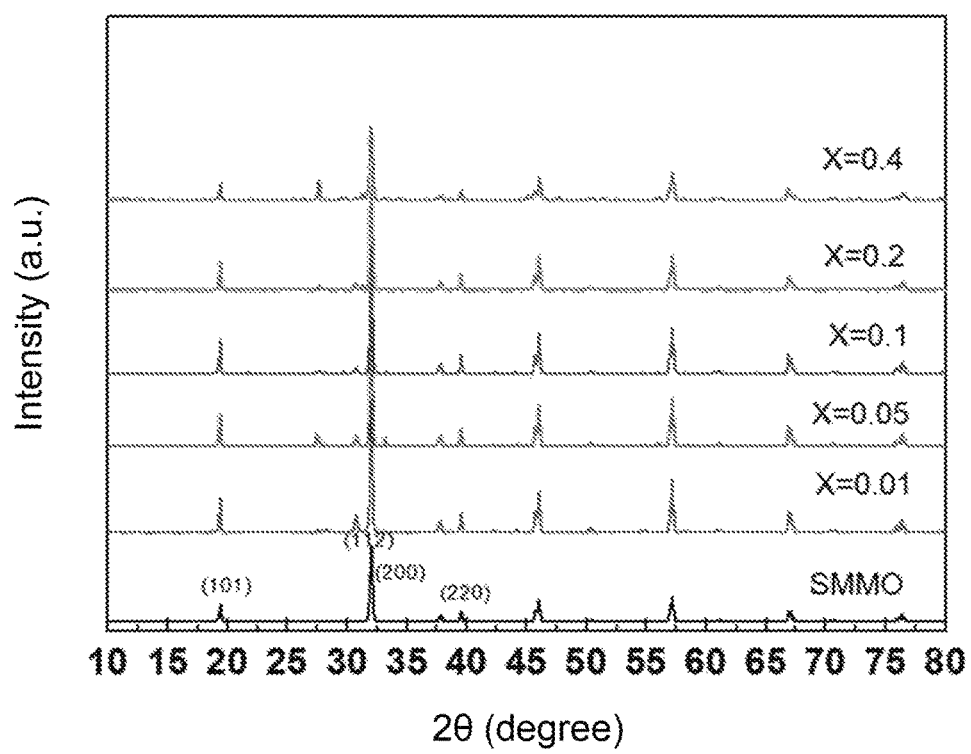
FIG. 2 shows an X-ray diffraction diagram of several embodiments of the present invention.

Please refer to FIG. 2, which shows an X-ray diffraction diagram of several embodiments of the present invention and comparison with the unreplaced SMMO. The chemical formula is $Sr_2Mg_{1-y}Cu_yMoO_6$, where $y=0.01$~$0.4$. It is thereby confirmed that a portion of magnesium is replaced by copper successfully.

Figure 3:
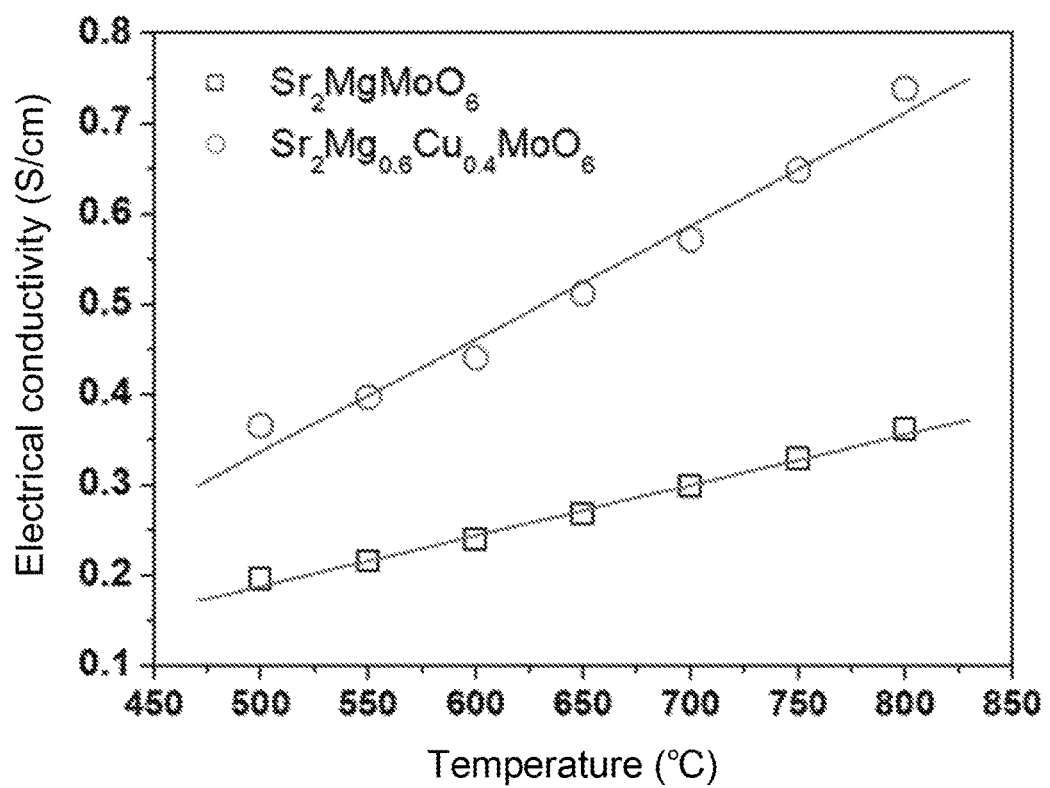
FIG. 3 shows an electrical conductivity diagram comparing $Sr_2Mg_{0.6}Cu_{0.4}MoO_6$ and unreplaced SMMO.

Furthermore, please refer to FIG. 3, which shows an electrical conductivity diagram comparing $Sr_2Mg_{0.6}Cu_{0.4}MoO_6$ and unreplaced SMMO. It is apparent that the performance of $Sr_2Mg_{0.6}Cu_{0.4}MoO_6$ in electrical conductivity is superior to SMMO.

In this test, SMMO and $Sr_2Mg_{0.6}Cu_{0.4}MoO_6$ powders are sifted, respectively. Next, an adhesive formed by ethyl cellulose and α-terpineol is added to the sifted powders. After uniform mixing, the powders are sifted and filled into a steel mold with pressure of 5 tons/m² to form a cylinder. Then the cylinder is sintered at the temperature of 1200° C.~1300° C. and in atmosphere for 8~48 hours to form a densified cylindrical sample. Afterwards, the densified cylindrical sample is reduced at 800° C. for 20 hours in 5% hydrogen/argon ambient. By using an AC impedance analyzer at 800° C. (the normal operating temperature of fuel cells) in hydrogen ambient, the measured electrical conductivity of SMMO material is 0.36 S/cm whereas that of $Sr_2Mg_{0.6}Cu_{0.4}MoO_6$ material is 0.74 S/cm. Compared to the SMMO material unreplaced by copper, the electrical conductivity of the replaced material is increased by 106%.

To sum up, the present invention discloses a strontium magnesium molybdenum oxide material having perovskite structure and the method for preparing the same. According to the tests, the electrical conductivity is increased for sure. Thereby, by having the capabilities of resisting carbon deposition and sulfur poisoning, the problem of low electrical conductivity of SMMO is conquered. Undoubtedly, the strontium magnesium molybdenum oxide material having perovskite structure and the method for preparing the same according to the present invention are highly valuable and can be applied to SOFC anodes.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A perovskite-type strontium magnesium molybdenum oxide material, having a chemical formula of $Sr_{2-x}Ce_xMg_{1-y}Cu_yMoO_{6-\delta}$, where $0 \leq x < 2$, $0 < y < 1$, and $0 < \delta < 6$.

2. A method for preparing a perovskite-type strontium magnesium molybdenum oxide material, comprising steps of:
mixing and dissolving strontium nitrate powder, magnesium nitrate hexahydrate powder, ammonium molybdate hexahydrate powder, copper nitrate powder, and cerium nitrate powder in deionized water to form a mixed solution;
adding citric acid to said mixed solution to form a gel;
baking said gel to form precursor powder; and
calcining said precursor powder to form a perovskite-type strontium magnesium molybdenum oxide material with a chemical formula of $Sr_{2-x}Ce_xMg_{1-y}Cu_yMoO_{6-\delta}$, where $0 \leq x < 2$, $0 < y < 1$, and $0 < \delta < 6$;
where the molar ratios of said strontium nitrate powder, said magnesium nitrate hexahydrate powder, said ammonium molybdate hexahydrate powder, said copper nitrate powder, and said cerium nitrate powder correspond to the molar ratios of the composing elements in said chemical formula.

3. The method for preparing a perovskite-type strontium magnesium molybdenum oxide material of claim 2, wherein said step of forming said mixed solution is performed at the temperature of 50-70° C.

4. The method for preparing a perovskite-type strontium magnesium molybdenum oxide material of claim 2, wherein said step of forming said gel is performed at the temperature of 70-90° C.

5. The method for preparing a perovskite-type strontium magnesium molybdenum oxide material of claim 2, wherein the molar ratio of said citric acid to the metal ions in said mixed solution is 1:1.

6. The method for preparing a perovskite-type strontium magnesium molybdenum oxide material of claim 2, wherein said step of forming said precursor powder is to bake said gel at 100-120° C.

7. The method for preparing a perovskite-type strontium magnesium molybdenum oxide material of claim 2, and before said step of calcining said precursor powder, further comprising a step of performing thermal treatments on said precursor powder in two stages to decompose the organics in said precursor powder; the temperature of one stage of said thermal treatment being 300-500° C.; and the temperature of the other stage of said thermal treatment being 700-1000° C.

8. The method for preparing a perovskite-type strontium magnesium molybdenum oxide material of claim 2, wherein said step of calcining said precursor powder is to first calcine in atmosphere for 8-24 hours and then calcine in hydrogen reduction ambient for 20-48 hours.

9. The method for preparing a perovskite-type strontium magnesium molybdenum oxide material of claim 8, wherein the calcining temperature is 1200° C.-1300° C. in atmosphere.

10. The method for preparing a perovskite-type strontium magnesium molybdenum oxide material of claim 8, wherein the reduction temperature is 800° C. in hydrogen ambient.

* * * * *